United States Patent
Zhou et al.

(10) Patent No.: US 12,040,918 B2
(45) Date of Patent: Jul. 16, 2024

(54) METHOD AND RECEIVER FOR FREQUENCY OFFSET ESTIMATION

(71) Applicant: Telefonaktiebolaget LM Ericsson (publ), Stockholm (SE)

(72) Inventors: Wei Zhou, Beijing (CN); Yali Pei, Beijing (CN); Qi Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 87 days.

(21) Appl. No.: 17/777,068

(22) PCT Filed: Nov. 15, 2019

(86) PCT No.: PCT/CN2019/118797
§ 371 (c)(1),
(2) Date: May 16, 2022

(87) PCT Pub. No.: WO2021/092898
PCT Pub. Date: May 20, 2021

(65) Prior Publication Data
US 2022/0407746 A1 Dec. 22, 2022

(51) Int. Cl.
*H04L 23/02* (2006.01)
*H04L 25/02* (2006.01)
*H04L 27/26* (2006.01)

(52) U.S. Cl.
CPC ...... *H04L 25/0226* (2013.01); *H04L 27/2657* (2013.01)

(58) Field of Classification Search
CPC ............ H04L 27/2657; H04L 27/2675; H04L 2027/0024; H04L 27/22; H04L 2027/0065; H04B 1/7075; H04B 2203/5495

(Continued)

(56) References Cited

U.S. PATENT DOCUMENTS

2012/0207257 A1* 8/2012 Park ............... H04L 27/2657
 375/348
2013/0230085 A1* 9/2013 Linn ............... H03D 13/00
 375/226

(Continued)

FOREIGN PATENT DOCUMENTS

CN 101026408 A 8/2007
CN 101789807 A 7/2010

OTHER PUBLICATIONS

International Search Report and Written Opinion of the International Searching Authority, PCT/CN2019/118797, mailed Aug. 11, 2020, 9 pages.

(Continued)

*Primary Examiner* — Khai Tran
(74) *Attorney, Agent, or Firm* — Sage Patent Group

(57) ABSTRACT

The present disclosure provides a method in a receiver for frequency offset estimation. The method includes: for each of two or more pairs of symbols in a set of symbols from a transmitter: calculating a phase difference between a first symbol and a second symbol in the pair; and removing from the calculated phase difference a phase difference component due to a difference between information carried in the first symbol and information carried in the second symbol, to obtain a residual phase difference component. The method further includes: estimating a frequency offset between the receiver and the transmitter as a function of the respective residual phase difference components obtained for the two or more pairs.

12 Claims, 7 Drawing Sheets

(58) Field of Classification Search
USPC .......................................... 375/262, 260, 267
See application file for complete search history.

(56) References Cited

U.S. PATENT DOCUMENTS

2017/0012671 A1*  1/2017  Demaj .................. H04L 25/023
2022/0021484 A1*  1/2022  Huang .................... H04L 1/08

OTHER PUBLICATIONS

"Remaining details of D2D physical channel design," 3GPP TSG RAN WG1 Meeting #77, R1-142031, Seoul, Korea, May 19-May 23, 2014, Intel Corporation, Agenda Item 6.2.5.1.1, 11 pages.
3rd Generation Partnership Project; Technical Specification Group Radio Access Network; Evolved Universal Terrestrial Radio Access (E-UTRA); Physical channels and modulation (Release 15) 3GPP TS 36.211 V15.4.0 (Dec. 2018) 240 pages.
3rd Generation Partnership Project; Technical Specification Group Radio Access Network; Evolved Universal Terrestrial Radio Access (E-UTRA); Radio Resource Control (RRC); Protocol specification (Release 15) 3GPP TS 36.331 V15.4.0 (Dec. 2018) 933 pages.
Extended European Search Report, European Patent Application No. 1995222.5, mailed Jun. 22, 2023, 14 pages.
Tsai, Y-R, et al., "Data-Carrier Aided Carrier Frequency Offset Estimation for OFDM Systems," Vehicular Technology Conference, 2008, VTC Spring 2008, IEEE Piscataway, NJ, USA, May 11, 2008, pp. 898-902, XP031255658, 5 pages.

* cited by examiner

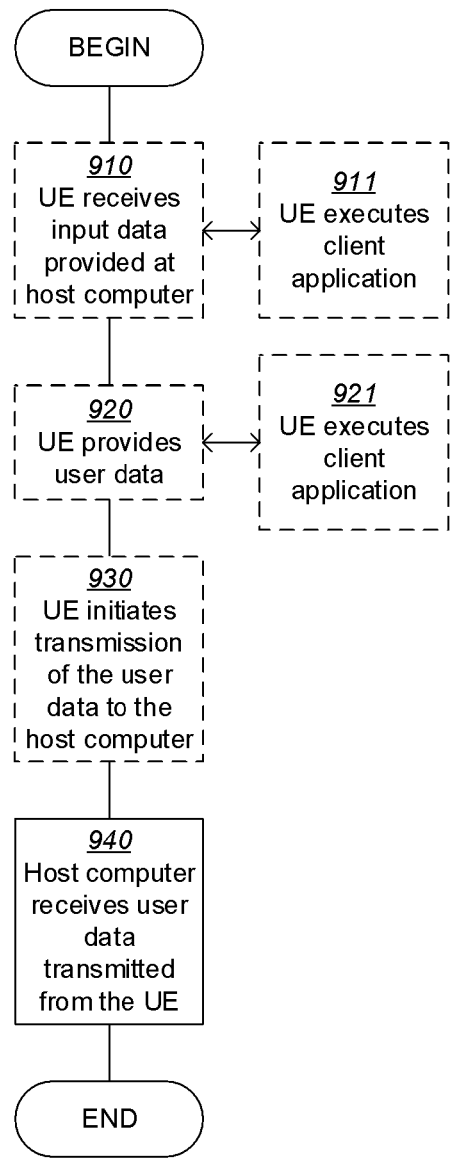
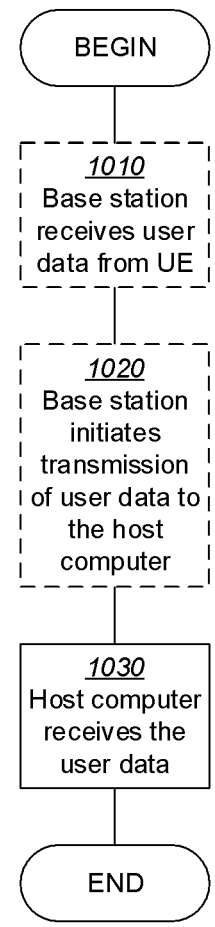
FIG. 9
FIG. 10

METHOD AND RECEIVER FOR FREQUENCY OFFSET ESTIMATION

CROSS REFERENCE TO RELATED APPLICATIONS

This application is a 35 U.S.C. § 371 national stage application of PCT International Application No. PCT/CN2019/118797 filed on Nov. 15, 2019, the disclosure and content of which is incorporated by reference herein in its entirety.

TECHNICAL FIELD

The present disclosure relates to communication technology, and more particularly, to a method and a receiver for frequency offset estimation.

BACKGROUND

Accurate frequency offset estimation is critical to demodulation performance of signals. Even in a scenario of Narrow Band-Internet of Things (NB-IoT), which is designed mainly for static User Equipments (UEs) and thus typically does not have a large Doppler frequency offset, a frequency offset due to crystal oscillation still needs to be estimated and compensated for, in order to obtain a better demodulation performance at a low Signal to Interference plus Noise Ratio (SINR), especially for signals having a high center frequency.

Conventionally, a frequency offset is estimated based on Demodulation Reference Signals (DMRSs). However, it may be difficult to estimate a frequency offset based on Narrowband Physical Uplink Shared Channel (NPUSCH) accurately, due to a relatively long interval between DMRS symbols and a relatively small number of DMRS symbols available for frequency offset estimation. In NB-IoT, the interval between DMRS symbols is 7 symbols or 0.5 ms, meaning that a frequency offset estimation range is only ±1000 Hz.

It is desired to provide an improved accuracy of frequency offset estimation and/or an increased frequency offset estimation range.

SUMMARY

It is an object of the present disclosure to provide a method and a receiver for frequency offset estimation, capable of providing an improved accuracy of frequency offset estimation and/or an increased frequency offset estimation range.

According to a first aspect of the present disclosure, a method in a receiver for frequency offset estimation is provided. The method includes, for each of two or more pairs of symbols in a set of symbols from a transmitter: calculating a phase difference between a first symbol and a second symbol in the pair; and removing from the calculated phase difference a phase difference component due to a difference between information carried in the first symbol and information carried in the second symbol, to obtain a residual phase difference component. The method further includes: estimating a frequency offset between the receiver and the transmitter as a function of the respective residual phase difference components obtained for the two or more pairs.

In an embodiment, for each of the two or more pairs of symbols, the phase difference between the first symbol and the second symbol may be calculated based on a plurality of samples in the first symbol and a plurality of samples in the second symbol.

In an embodiment, the plurality of samples in the first symbol may be obtained by removing from the first symbol a first number of samples at a beginning of the first symbol and/or a second number of samples at an end of the first symbol, and the plurality of samples in the second symbol may be obtained by removing from the second symbol the first number of samples at a beginning of the second symbol and/or the second number of samples at an end of the second symbol.

In an embodiment, each of the two or more pairs of symbols may have a same interval between the first symbol and the second symbol in the pair.

In an embodiment, for each of the two or more pairs of symbols, the operation of removing from the calculated phase difference the phase difference component due to the difference between the information carried in the first symbol and the information carried in the second symbol may include: determining a plurality of possible phase differences due to the difference between the information carried in the first symbol and the information carried in the second symbol, based on a modulation scheme used for the pair of symbols; determining one of the plurality of possible phase differences as the phase difference component; and compensating for the phase difference component in the calculated phase difference.

In an embodiment, the operation of estimating may include: estimating the frequency offset based on an average of the respective residual phase difference components obtained for the two or more pairs.

In an embodiment, the set of symbols may be received in one single carrier or subcarrier.

In an embodiment, the set of symbols may be derived from a sequence of symbols received in an NB-IoT uplink transmission.

In an embodiment, when the sequence of symbols is transmitted in a non-Direct Current (DC) subcarrier, the set of symbols may be derived by preprocessing the sequence of symbols to compensate for a frequency offset between the non-DC subcarrier and a DC subcarrier.

In an embodiment, the two or more pairs of symbols may include DMRS symbols and data symbols.

According to a second aspect of the present disclosure, a receiver is provided. The receiver includes a communication interface, a processor and a memory. The memory stores instructions executable by the processor whereby the receiver is operative to perform the method according to the above first aspect.

According to a third aspect of the present disclosure, a computer readable storage medium is provided. The computer readable storage medium has computer program instructions stored thereon. The computer program instructions, when executed by a processor in a receiver, cause the receiver to perform the method according to the above first aspect.

With the embodiments of the present disclosure, for each of two or more pairs of symbols from a transmitter, a phase difference between a first symbol and a second symbol in the pair can be calculated and a phase difference component due to a difference between information carried in the first symbol and information carried in the second symbol can be removed from the calculated phase difference to obtain a residual phase difference component. A frequency offset between the receiver and the transmitter can be calculated as a function of the respective residual phase difference components obtained for the two or more pairs. In this way, in addition to DMRS symbols, data symbols can be used for frequency offset estimation, which is advantageous in improving the frequency offset estimation accuracy as more symbol samples are usable. Meanwhile, the frequency offset estimation range can be increased, e.g., when a shorter interval between symbols in each pair is adopted.

BRIEF DESCRIPTION OF THE DRAWINGS

The above and other objects, features and advantages will be more apparent from the following description of embodiments with reference to the figures, in which:

FIGS. 7 to 10 are flowcharts illustrating methods implemented in a communication system including a host computer, a base station and a user equipment.

DETAILED DESCRIPTION

Figure 1:
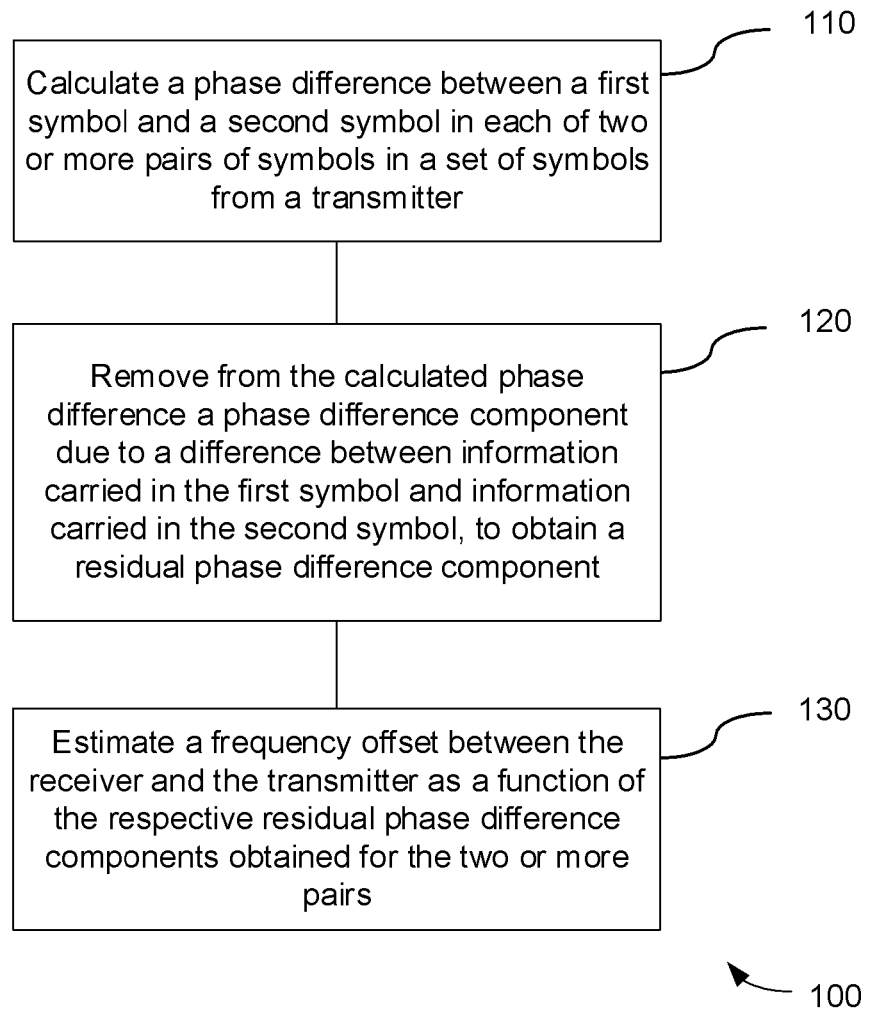
FIG. 1 is a flowchart illustrating a method for frequency offset estimation according to an embodiment of the present disclosure.

As used herein, the term "wireless communication network" refers to a network following any suitable communication standards, such as NR, LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable 1G (the first generation), 2G (the second generation), 2.5G, 2.75G, 3G (the third generation), 4G (the fourth generation), 4.5G, 5G (the fifth generation) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network device" refers to a device in a wireless communication network via which a terminal device accesses the network and receives services therefrom. The network device refers to a base station (BS), an access point (AP), or any other suitable device in the wireless communication network. The BS may be, for example, a node B (NodeB or NB), an evolved NodeB (eNodeB or eNB), or (next) generation NodeB (gNB), a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "network node" refers to a device connected to a network device such as a BS or an AP, e.g., via any appropriate network. For example, the network node may refer to a cloud server, a cloud computing node or any other node capable of data processing, computing and/or communicating information with one or more network devices.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, desktop computers, image capture terminal devices such as digital cameras, gaming terminal devices, music storage and playback appliances, a mobile phone, a cellular phone, a smart phone, voice over IP (VoIP) phones, wireless local loop phones, tablets, personal digital assistants (PDAs), wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink transmission refers to a transmission from a network device to a terminal device, and an uplink transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

FIG. 1 is a flowchart illustrating a method 100 for frequency offset estimation according to an embodiment of the present disclosure. The method 100 can be performed at a receiver. In an example, the method 100 can be applied to e.g., an NB-IoT uplink single-tone (single-subcarrier) transmission and can be performed at a network device (e.g., a gNB). However, the present disclosure is not limited to the NB-IoT uplink transmission. Rather, the method 100 can be applied to any single-carrier or single-subcarrier transmission. The method 100 can estimate frequency offset due to e.g., crystal oscillation, rather than a Doppler frequency offset. Thus, the method 100 may be used at a receiver in a relatively stable state, or the method 100 may be used in combination with another method capable of removing a Doppler frequency offset.

It is assumed that slot synchronization has been accomplished before the method 100 is performed so that symbols, e.g., OFDM (Orthogonal Frequency Division Multiplexing) symbols can be identified. The approaches for slot synchronization are well known in the art, such as those based on CP (Cyclic Prefix).

At block 110, for each of two or more pairs of symbols in a set of symbols from a transmitter (e.g., a UE), a phase difference between a first symbol and a second symbol in the pair is calculated.

Here, as discussed above, the set of symbols can be received in one single carrier or subcarrier.

The set of symbols can be consecutive symbols or non-consecutive symbols from the sequence of symbols. The pair of symbols is merely for comparison and consists of any two different symbols in the set of symbols. Since the symbols in any pair, i.e., for comparison, are not limited to DMRS symbols, the intervals between symbols used for frequency offset estimation can be shortened and more symbols can be used. Thus, the range and accuracy of frequency offset estimation can be increased.

In an example, the set of symbols can be derived from a sequence of symbols received in an NB-IoT uplink (single-tone) transmission (e.g., an NPUSCH transmission). In this case, when the sequence of symbols is transmitted in a non-Direct Current (DC) subcarrier, the set of symbols can be derived by preprocessing the sequence of symbols to compensate for a frequency offset between the non-DC subcarrier and a DC subcarrier. In particular, the frequency offset between the non-DC subcarrier and the DC subcarrier, denoted as fo_init, can be expressed as:

$$fo\_init=(k\_-Nsc\_ul/2)*fc \quad (1)$$

where k_ denotes a subcarrier index of NPUSCH, Nsc_ul denotes the number of uplink subcarriers, and fc denotes a subcarrier spacing. In an example, for a subcarrier spacing fc=15 KHz, Nsc_ul=12 uplink subcarriers having indices 0~11 can be configured, with the DC subcarrier having an index of 6. In another example, for a subcarrier spacing fc=3.75 KHz, Nsc_ul=48 uplink subcarriers having indices 0~47 can be configured, with the DC subcarrier having an index of 24. The frequency offset fo_init can be compensated for according to:

$$y\_rx\_foc=y\_rx \cdot *\exp(j*2\pi*fo\_init*(t-Ncp)) \quad (2)$$

where y_rx denotes a received signal, which is assumed to be slot-synchronized, (·*) denotes element-wise multiplication, j is an imaginary unit, t=(0~length(y_rx)−1)*Ts, Ncp=Lcp*Ts, and y_rx_foc denotes a signal obtained by compensating for the frequency offset fo_init, where length (y_rx) is the number of samples in y_rx, Ts=1/fs, fs is a sampling rate, and Lcp is the number of samples in a Cyclic Prefix (CP) for the first symbol within a slot. This preprocessing can be omitted when the sequence of symbols is transmitted in the DC subcarrier.

In an example, the two or more pairs of symbols may include DMRS symbols and data symbols. For example, the first symbol and the second symbol in each pair can be both DMRS symbols, both data symbols, or one DMRS symbol and one data symbol.

In an example, in the block 110, the phase difference between the first symbol and the second symbol can be calculated based on a plurality of samples in the first symbol and a plurality of samples in the second symbol. For example, due to filter characteristics, some samples at a beginning of each symbol and/or some samples at an end of each symbol may not be used in the calculation. That is, the plurality of samples in the first symbol may be obtained by removing from the first symbol a first number of samples at a beginning of the first symbol and/or a second number of samples at an end of the first symbol, and the plurality of samples in the second symbol may be obtained by removing from the second symbol the first number of samples at a beginning of the second symbol and/or the second number of samples at an end of the second symbol.

In an example, each of the two or more pairs of symbols may have a same interval between the first symbol and the second symbol in the pair. The interval may be set to one or more symbols. The interval may be set to a large value (e.g., larger than or equal to seven symbols) in order to achieve a high frequency offset estimation accuracy, or a small value (e.g., one symbol) in order to achieve a large frequency offset estimation range. In an example, each and every symbol in the set can be utilized here. Assuming that the set contains Ns symbols having indices #0~Ns−1 and the interval is set to 2, phase differences are calculated between symbols 0 and 2, symbols 1 and 3, symbols 2 and 4, symbols 3 and 5, and so on.

In particular, in the block 110, the phase difference between the first symbol and the second symbol in each pair can be calculated as follows.

Let y1 denote the samples in the first symbol to be used for calculation of the phase difference in the block 110, and y2 denote the samples in the second symbol to be used for calculation of the phase difference in the block 110. In an example, y1 and y2 can be extracted from y_rx_foc as follows:

$$y1=y\_rx\_foc(ns+(n\_start:n\_end))$$

$$y2=y\_rx\_foc(ns+\Delta+(n\_start:n\_end)) \quad (3)$$

where ns is an index of the first sample in the first symbol, n_start and n_end represent an index of the first sample and an index of the last sample to be used for calculation of the phase difference, respectively, and $\Delta$ is an interval, in units of Ts, between the first symbol and the second symbol. Here, the symbol length of each symbol is Nsym=Lcp+Nfft, where Nfft is a Fast Fourier Transform (FFT) size. $\Delta$ could be a multiple of the symbol length, i.e., $\Delta=i*Nsym$, where i=1, 2, ..., for NB-IoT, e.g., i can be a value from 1 to 7, but not limited to 1 to 7.

Alternatively, when the above frequency offset compensation according to Equations (1) and (2) is omitted, e.g., when the sequence of symbols is transmitted in the DC subcarrier, y1 and y2 can be extracted from y_rx directly as follows:

$$y1=y\_rx(ns+(n\_start:n\_end))$$

$$y2=y\_rx(ns+\Delta+(n\_start:n\_end)). \quad (4)$$

Next, averages of y1 and y2 can be calculated as:

$$y1\_m=\text{mean}(y1)$$

$$y2\_m=\text{mean}(y2) \quad (5)$$

where y1_m denotes an average of y1, y2_m denotes an average of y2, and mean( ) denotes an average operation.

Then, the phase difference can be calculated as:

$$y12=\text{conj}(y1\_m)*y2\_m \quad (6)$$

and $$p12=\text{angle}(y12) \quad (7)$$

where conj( ) is a conjugate operation, p12 denotes the phase difference, and angle( ) denotes an operation to obtain a phase angle.

As an alternative to Equations (5)~(7), the phase difference can be calculated according to:

$$y12=\text{conj}(y1).*y2 \quad (8)$$

$$y12\_m=\text{mean}(y12) \quad (9)$$

$$p12=\text{angle}(y12\_m) \quad (10)$$

where .* denotes element-wise multiplication.

At block 120, for each of the two or more pairs of symbols, a phase difference component due to a difference between information carried in the first symbol and information carried in the second symbol is removed from the calculated phase difference, to obtain a residual phase difference component.

In particular, in the block 120, for each of the two or more pairs of symbols, a plurality of possible phase differences due to the difference between the information carried in the first symbol and the information carried in the second symbol can be determined based on a modulation scheme used for the pair of symbols, one of the plurality of possible phase differences can be determined as the phase difference component, and the phase difference component can be compensated for in the calculated phase difference.

Figure 2A:
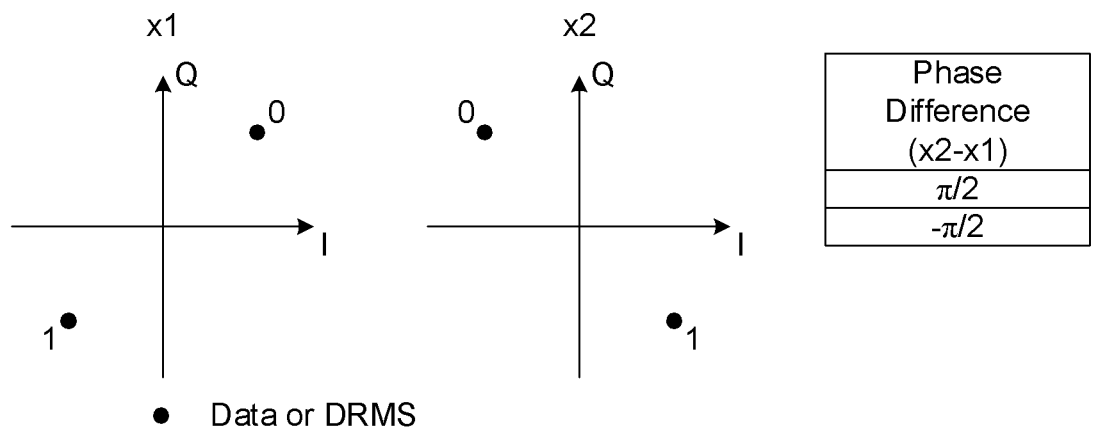
FIGS. 2A-2C are schematic diagrams showing modulation constellations for respective NPUSCH formats and corresponding possible phase differences.

FIG. 2A shows NPUSCH Format 1, π/2 Binary Phase Shift Keying (BPSK) modulation constellations (x1 for symbols having even indices and x2 for symbols having odd indices) and corresponding possible phase differences due to the difference between the information carried in the first symbol and the information carried in the second symbol. In this case, the possible phase differences include π/2 and −π/2.

Accordingly, a phase difference threshold can be set to 0 and the phase difference component can be determined based on the phase difference threshold and compensated for to obtain the residual phase difference component, denoted as pr, as follows:

```
If p12 >= 0
    pr = p12 − π/2
else
    pr = p12 + π/2
end
```

Figure 2B:
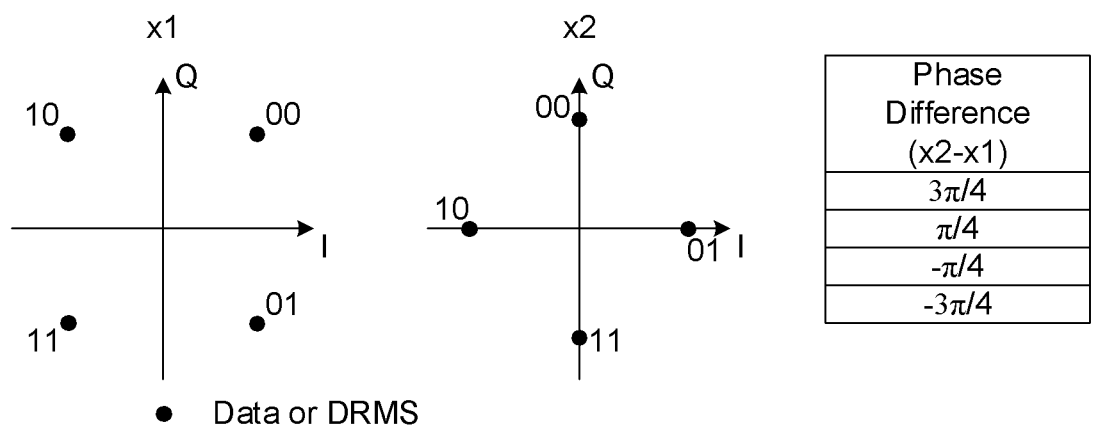

FIG. 2B shows NPUSCH Format 1, π/4 Quadrature Phase Shift Keying (QPSK) modulation constellations (x1 for symbols having even indices and x2 for symbols having odd indices) and corresponding possible phase differences due to the difference between the information carried in the first symbol and the information carried in the second symbol. In this case, the possible phase differences include 3π/4, π/4, −π/4 and −3π/4.

Accordingly, phase difference thresholds can be set to π/2, 0 and −π/2, and the phase difference component can be determined based on the phase difference thresholds and compensated for to obtain the residual phase difference component, denoted as pr, as follows:

```
If p12 >= π/2
    pr = p12 − 3π/4
else if p12 >= 0
    pr = p12 − π/4
else if p12 >= − π/2
    pr = p12 + π/4
else
    pr = p12 + 3π/4
end
```

Figure 2C:
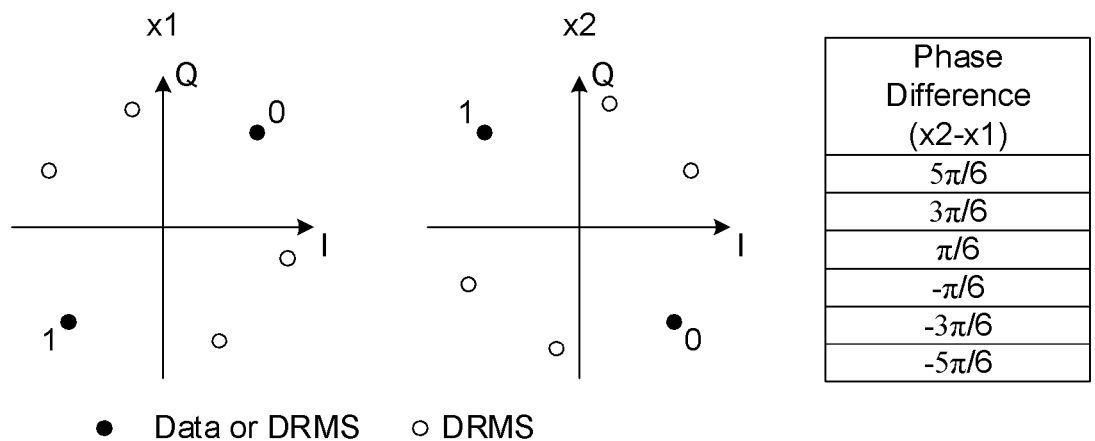

FIG. 2C shows NPUSCH Format 2, π/2 BPSK modulation constellations (x1 for symbols having even indices and x2 for symbols having odd indices) and corresponding possible phase differences due to the difference between the information carried in the first symbol and the information carried in the second symbol. In this case, the possible phase differences include 5π/6, 3π/6, π/6, −π/6, −3π/6 and −5π/6.

Accordingly, phase difference thresholds can be set to 2π/3, π/3, 0, −π/3 and −2π/3, and the phase difference component can be determined based on the phase difference thresholds and compensated for to obtain the residual phase difference component, denoted as pr, as follows:

```
If p12 >= 2π/3
    pr = p12 − 5π/6
else if p12 >= π/3
    pr = p12 − 3π/6
else if p12 >= 0
    pr = p12 − 1π/6
else if p12 >= −π/3
    pr = p12 + π/6
else if p12 >= −2π/3
    pr = p12 + 3π/6
else
    pr = p12 + 5π/6
end
```

At block 130, a frequency offset between the receiver and the transmitter is estimated as a function of the respective residual phase difference components obtained for the two or more pairs.

In an example, in the block 130, the frequency offset can be estimated based on an average of the respective residual phase difference components obtained for the two or more pairs.

In particular, an average (denoted as pr_m) of the respective residual phase difference components, pr, as calculated above for the two or more pairs, can be calculated and the frequency offset between the receiver and the transmitter can be estimated as:

$$fo = pr\_m/(2\pi \Delta Ts). \quad (11)$$

In the examples shown in FIGS. 2A-2C, the frequency offset estimation ranges that can be achieved according to the present disclosure can be ±7000/2 Hz, ±7000/4 Hz and ±7000/6 Hz, respectively.

Figure 3:
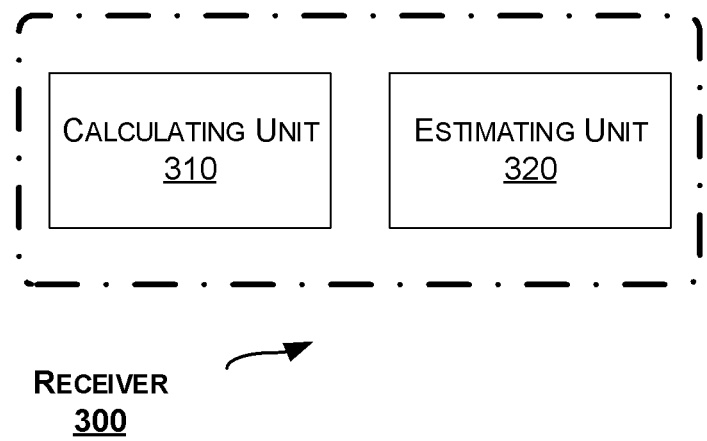
FIG. 3 is a block diagram of a receiver according to an embodiment of the present disclosure.

Correspondingly to the method 100 as described above, a receiver is provided. FIG. 3 is a block diagram of a receiver 300 according to an embodiment of the present disclosure. The receiver 300 can be, or can be provided at, a network device (e.g., gNB).

As shown in FIG. 3, the receiver 300 includes a calculating unit 310 configured to, for each of two or more pairs of symbols in a set of symbols from a transmitter: calculate a phase difference between a first symbol and a second symbol in the pair; and remove from the calculated phase difference a phase difference component due to a difference between information carried in the first symbol and information carried in the second symbol, to obtain a residual phase difference component. The receiver 300 further includes an estimating unit 320 configured to estimate a frequency offset between the receiver and the transmitter as a function of the respective residual phase difference components obtained for the two or more pairs.

In an embodiment, for each of the two or more pairs of symbols, the phase difference between the first symbol and the second symbol may be calculated based on a plurality of samples in the first symbol and a plurality of samples in the second symbol.

In an embodiment, the plurality of samples in the first symbol may be obtained by removing from the first symbol a first number of samples at a beginning of the first symbol and/or a second number of samples at an end of the first symbol, and the plurality of samples in the second symbol may be obtained by removing from the second symbol the first number of samples at a beginning of the second symbol and/or the second number of samples at an end of the second symbol.

In an embodiment, each of the two or more pairs of symbols may have a same interval between the first symbol and the second symbol in the pair.

In an embodiment, for each of the two or more pairs of symbols, the calculating unit 310 can be configured to remove from the calculated phase difference the phase difference component due to the difference between the information carried in the first symbol and the information carried in the second symbol may by: determining a plurality of possible phase differences due to the difference between the information carried in the first symbol and the information carried in the second symbol, based on a modulation scheme used for the pair of symbols; determining one of the plurality of possible phase differences as the phase difference component; and compensating for the phase difference component in the calculated phase difference.

In an embodiment, the estimating unit 320 can be configured to estimate the frequency offset based on an average of the respective residual phase difference components obtained for the two or more pairs.

In an embodiment, the set of symbols may be received in one single carrier or subcarrier.

In an embodiment, the set of symbols may be derived from a sequence of symbols received in an NB-IoT uplink transmission.

In an embodiment, when the sequence of symbols is transmitted in a non-DC subcarrier, the set of symbols may be derived by preprocessing the sequence of symbols to compensate for a frequency offset between the non-DC subcarrier and a DC subcarrier.

In an embodiment, the two or more pairs of symbols may include DMRS symbols and data symbols.

The calculating unit 310 and the estimating unit 320 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 1.

Figure 4:
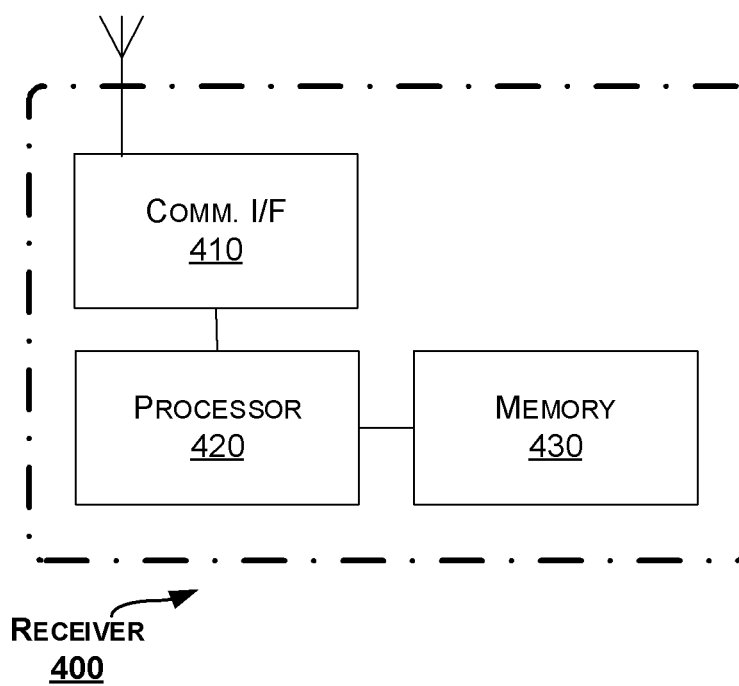
FIG. 4 is a block diagram of a receiver according to another embodiment of the present disclosure.

FIG. 4 is a block diagram of a receiver 400 according to another embodiment of the present disclosure. The receiver 400 can be, or can be provided at, a network device (e.g., gNB).

The receiver 400 includes a communication interface 410, a processor 420 and a memory 430. The memory 430 contains instructions executable by the processor 420 whereby the receiver 400 is operative to perform the actions, e.g., of the procedure described earlier in conjunction with FIG. 1. Particularly, the memory 430 contains instructions executable by the processor 420 whereby the receiver 400 is operative to: for each of two or more pairs of symbols in a set of symbols from a transmitter: calculate a phase difference between a first symbol and a second symbol in the pair; and remove from the calculated phase difference a phase difference component due to a difference between information carried in the first symbol and information carried in the second symbol, to obtain a residual phase difference component. The memory 430 further contains instructions executable by the processor 420 whereby the receiver 400 is operative to: estimate a frequency offset between the receiver and the transmitter as a function of the respective residual phase difference components obtained for the two or more pairs.

In an embodiment, for each of the two or more pairs of symbols, the phase difference between the first symbol and the second symbol may be calculated based on a plurality of samples in the first symbol and a plurality of samples in the second symbol.

In an embodiment, the plurality of samples in the first symbol may be obtained by removing from the first symbol a first number of samples at a beginning of the first symbol and/or a second number of samples at an end of the first symbol, and the plurality of samples in the second symbol may be obtained by removing from the second symbol the first number of samples at a beginning of the second symbol and/or the second number of samples at an end of the second symbol.

In an embodiment, each of the two or more pairs of symbols may have a same interval between the first symbol and the second symbol in the pair.

In an embodiment, for each of the two or more pairs of symbols, the operation of removing from the calculated phase difference the phase difference component due to the difference between the information carried in the first symbol and the information carried in the second symbol may include: determining a plurality of possible phase differences due to the difference between the information carried in the first symbol and the information carried in the second symbol, based on a modulation scheme used for the pair of symbols; determining one of the plurality of possible phase differences as the phase difference component; and compensating for the phase difference component in the calculated phase difference.

In an embodiment, the operation of estimating may include: estimating the frequency offset based on an average of the respective residual phase difference components obtained for the two or more pairs.

In an embodiment, the set of symbols may be received in one single carrier or subcarrier.

In an embodiment, the set of symbols may be derived from a sequence of symbols received in an NB-IoT uplink transmission.

In an embodiment, when the sequence of symbols is transmitted in a non-Direct Current (DC) subcarrier, the set of symbols may be derived by preprocessing the sequence of symbols to compensate for a frequency offset between the non-DC subcarrier and a DC subcarrier.

In an embodiment, the two or more pairs of symbols may include DMRS symbols and data symbols.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 420 causes the receiver 400 to perform the actions, e.g., of the procedure described earlier in conjunction with FIG. 1.

The computer program product may be configured as a computer program code structured in computer program modules. The computer program modules could essentially perform the actions of the flow illustrated in FIG. 1.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

Figure 5:
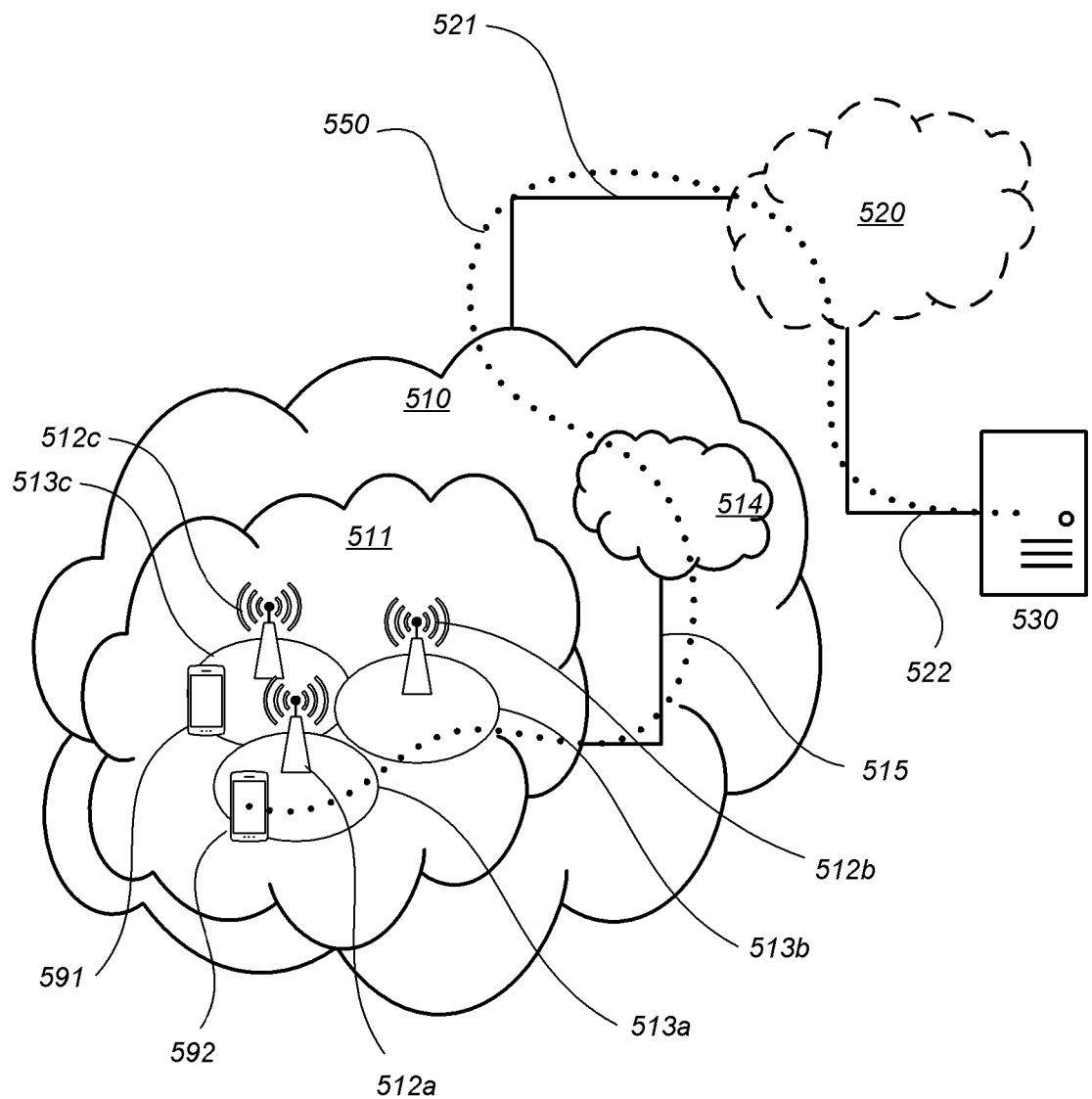
FIG. 5 schematically illustrates a telecommunication network connected via an intermediate network to a host computer.

With reference to FIG. 5, in accordance with an embodiment, a communication system includes a telecommunication network 510, such as a 3GPP-type cellular network, which comprises an access network 511, such as a radio access network, and a core network 514. The access network 511 comprises a plurality of base stations 512a, 512b, 512c, such as NBs, eNBs, gNBs or other types of wireless access points, each defining a corresponding coverage area 513a, 513b, 513c. Each base station 512a, 512b, 512c is connectable to the core network 514 over a wired or wireless connection 515. A first user equipment (UE) 591 located in coverage area 513c is configured to wirelessly connect to, or be paged by, the corresponding base station 512c. A second UE 592 in coverage area 513a is wirelessly connectable to the corresponding base station 512a. While a plurality of UEs 591, 592 are illustrated in this example, the disclosed embodiments are equally applicable to a situation where a sole UE is in the coverage area or where a sole UE is connecting to the corresponding base station 512.

The telecommunication network 510 is itself connected to a host computer 530, which may be embodied in the hardware and/or software of a standalone server, a cloud-implemented server, a distributed server or as processing resources in a server farm. The host computer 530 may be under the ownership or control of a service provider, or may be operated by the service provider or on behalf of the service provider. The connections 521, 522 between the telecommunication network 510 and the host computer 530 may extend directly from the core network 514 to the host computer 530 or may go via an optional intermediate network 520. The intermediate network 520 may be one of, or a combination of more than one of, a public, private or hosted network; the intermediate network 520, if any, may be a backbone network or the Internet; in particular, the intermediate network 520 may comprise two or more sub-networks (not shown).

The communication system of FIG. 5 as a whole enables connectivity between one of the connected UEs 591, 592 and the host computer 530. The connectivity may be described as an over-the-top (OTT) connection 550. The host computer 530 and the connected UEs 591, 592 are configured to communicate data and/or signaling via the OTT connection 550, using the access network 511, the core network 514, any intermediate network 520 and possible further infrastructure (not shown) as intermediaries. The OTT connection 550 may be transparent in the sense that the participating communication devices through which the OTT connection 550 passes are unaware of routing of uplink and downlink communications. For example, a base station 512 may not or need not be informed about the past routing of an incoming downlink communication with data originating from a host computer 530 to be forwarded (e.g., handed over) to a connected UE 591. Similarly, the base station 512 need not be aware of the future routing of an outgoing uplink communication originating from the UE 591 towards the host computer 530.

Example implementations, in accordance with an embodiment, of the UE, base station and host computer discussed in the preceding paragraphs will now be described with reference to FIG. 6. In a communication system 600, a host computer 610 comprises hardware 615 including a communication interface 616 configured to set up and maintain a wired or wireless connection with an interface of a different communication device of the communication system 600. The host computer 610 further comprises processing circuitry 618, which may have storage and/or processing capabilities. In particular, the processing circuitry 618 may comprise one or more programmable processors, application-specific integrated circuits, field programmable gate arrays or combinations of these (not shown) adapted to execute instructions. The host computer 610 further comprises software 611, which is stored in or accessible by the host computer 610 and executable by the processing circuitry 618. The software 611 includes a host application 612. The host application 612 may be operable to provide a service to a remote user, such as a UE 630 connecting via an OTT connection 650 terminating at the UE 630 and the host computer 610. In providing the service to the remote user, the host application 612 may provide user data which is transmitted using the OTT connection 650.

The communication system 600 further includes a base station 620 provided in a telecommunication system and comprising hardware 625 enabling it to communicate with the host computer 610 and with the UE 630. The hardware 625 may include a communication interface 626 for setting up and maintaining a wired or wireless connection with an interface of a different communication device of the communication system 600, as well as a radio interface 627 for setting up and maintaining at least a wireless connection 670 with a UE 630 located in a coverage area (not shown in FIG. 6) served by the base station 620. The communication interface 626 may be configured to facilitate a connection 660 to the host computer 610. The connection 660 may be direct or it may pass through a core network (not shown in FIG. 6) of the telecommunication system and/or through one or more intermediate networks outside the telecommunication system. In the embodiment shown, the hardware 625 of the base station 620 further includes processing circuitry 628, which may comprise one or more programmable processors, application-specific integrated circuits, field programmable gate arrays or combinations of these (not shown) adapted to execute instructions. The base station 620 further has software 621 stored internally or accessible via an external connection.

The communication system 600 further includes the UE 630 already referred to. Its hardware 635 may include a radio interface 637 configured to set up and maintain a wireless connection 670 with a base station serving a coverage area in which the UE 630 is currently located. The hardware 635 of the UE 630 further includes processing circuitry 638, which may comprise one or more programmable processors, application-specific integrated circuits, field programmable gate arrays or combinations of these (not shown) adapted to execute instructions. The UE 630 further comprises software 631, which is stored in or accessible by the UE 630 and executable by the processing circuitry 638. The software 631 includes a client application 632. The client application 632 may be operable to provide a service to a human or non-human user via the UE 630, with the support of the host computer 610. In the host computer 610, an executing host application 612 may communicate with the executing client application 632 via the OTT connection 650 terminating at the UE 630 and the host computer 610. In providing the service to the user, the client application 632 may receive request data from the host application 612 and provide user data in response to the request data. The OTT connection 650 may transfer both the request data and the user data. The client application 632 may interact with the user to generate the user data that it provides.

Figure 6:
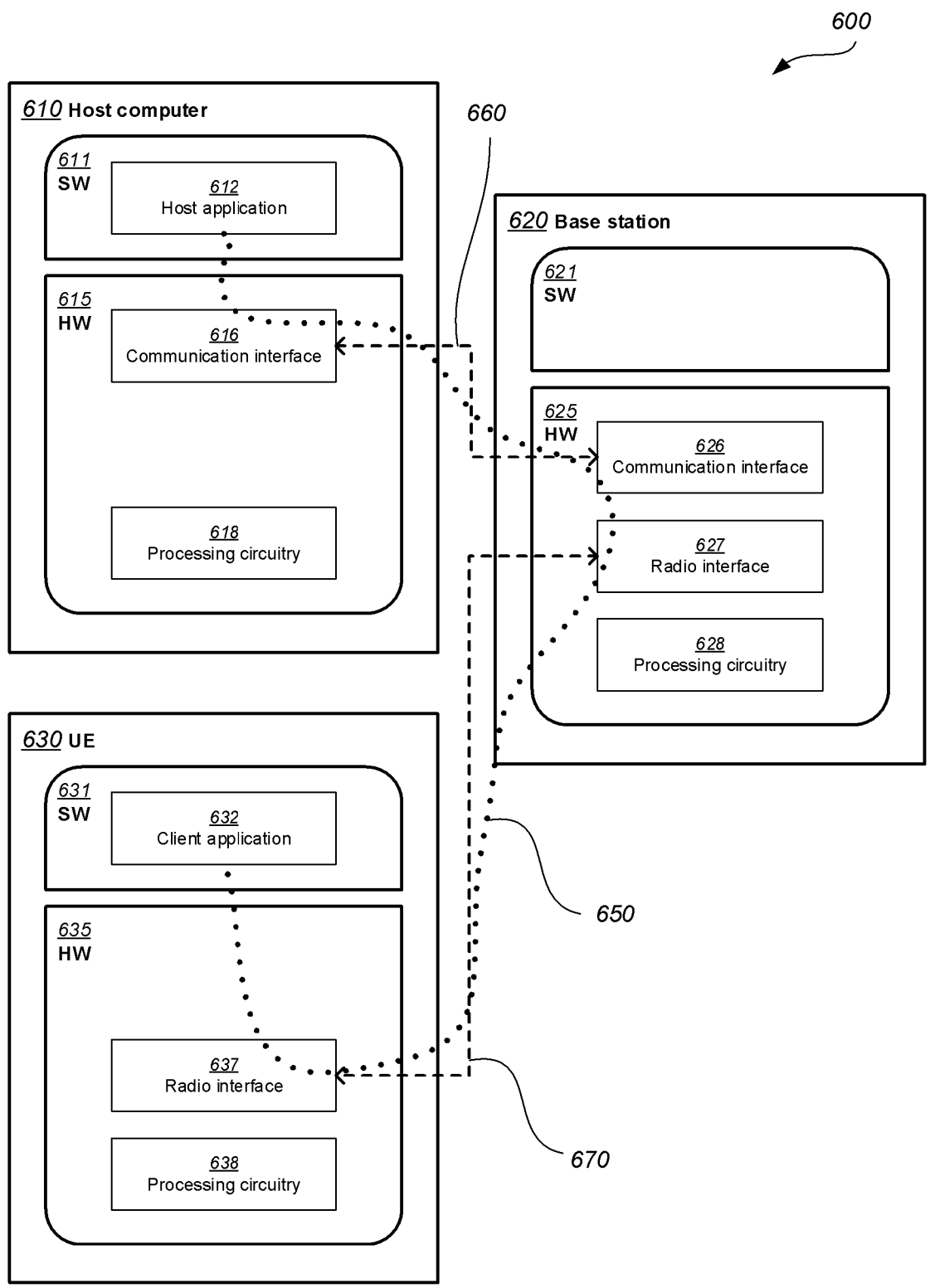
FIG. 6 is a generalized block diagram of a host computer communicating via a base station with a user equipment over a partially wireless connection.

It is noted that the host computer 610, base station 620 and UE 630 illustrated in FIG. 6 may be identical to the host computer 530, one of the base stations 512a, 512b, 512c and one of the UEs 591, 592 of FIG. 5, respectively. This is to say, the inner workings of these entities may be as shown in FIG. 6 and independently, the surrounding network topology may be that of FIG. 5.

In FIG. 6, the OTT connection 650 has been drawn abstractly to illustrate the communication between the host computer 610 and the use equipment 630 via the base station 620, without explicit reference to any intermediary devices and the precise routing of messages via these devices. Network infrastructure may determine the routing, which it may be configured to hide from the UE 630 or from the service provider operating the host computer 610, or both. While the OTT connection 650 is active, the network infrastructure may further take decisions by which it dynamically changes the routing (e.g., on the basis of load balancing consideration or reconfiguration of the network).

The wireless connection 670 between the UE 630 and the base station 620 is in accordance with the teachings of the embodiments described throughout this disclosure. One or more of the various embodiments improve the performance of OTT services provided to the UE 630 using the OTT connection 650, in which the wireless connection 670 forms the last segment. More precisely, the teachings of these embodiments may improve data rate and thereby provide benefits such as reduced user waiting time.

A measurement procedure may be provided for the purpose of monitoring data rate, latency and other factors on which the one or more embodiments improve. There may further be an optional network functionality for reconfiguring the OTT connection 650 between the host computer 610 and UE 630, in response to variations in the measurement results. The measurement procedure and/or the network functionality for reconfiguring the OTT connection 650 may be implemented in the software 611 of the host computer 610 or in the software 631 of the UE 630, or both. In embodiments, sensors (not shown) may be deployed in or in association with communication devices through which the OTT connection 650 passes; the sensors may participate in the measurement procedure by supplying values of the monitored quantities exemplified above, or supplying values of other physical quantities from which software 611, 631 may compute or estimate the monitored quantities. The reconfiguring of the OTT connection 650 may include message format, retransmission settings, preferred routing etc.; the reconfiguring need not affect the base station 620, and it may be unknown or imperceptible to the base station 620. Such procedures and functionalities may be known and practiced in the art. In certain embodiments, measurements may involve proprietary UE signaling facilitating the host computer's 610 measurements of throughput, propagation times, latency and the like. The measurements may be implemented in that the software 611, 631 causes messages to be transmitted, in particular empty or 'dummy' messages, using the OTT connection 650 while it monitors propagation times, errors etc.

Figure 7:
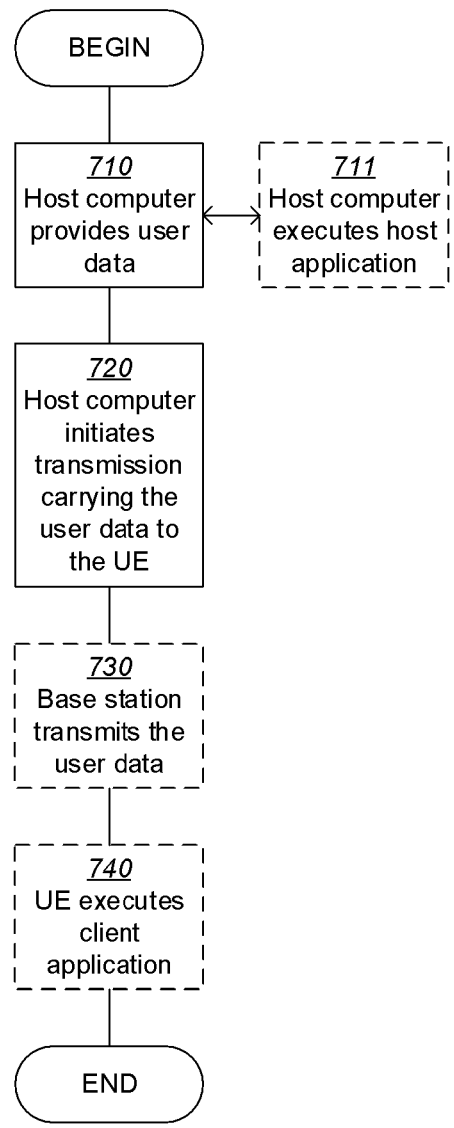

FIG. 7 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 7 will be included in this section. In a first step 710 of the method, the host computer provides user data. In an optional substep 711 of the first step 710, the host computer provides the user data by executing a host application. In a second step 720, the host computer initiates a transmission carrying the user data to the UE. In an optional third step 730, the base station transmits to the UE the user data which was carried in the transmission that the host computer initiated, in accordance with the teachings of the embodiments described throughout this disclosure. In an optional fourth step 740, the UE executes a client application associated with the host application executed by the host computer.

Figure 8:
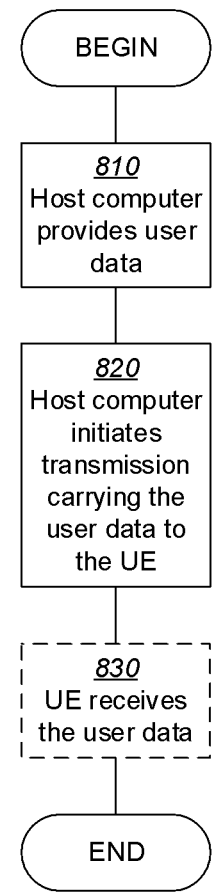

FIG. 8 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 8 will be included in this section. In a first step 810 of the method, the host computer provides user data. In an optional substep (not shown) the host computer provides the user data by executing a host application. In a second step 820, the host computer initiates a transmission carrying the user data to the UE. The transmission may pass via the base station, in accordance with the teachings of the embodiments described throughout this disclosure. In an optional third step 830, the UE receives the user data carried in the transmission.

FIG. 9 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 9 will be included in this section. In an optional first step 910 of the method, the UE receives input data provided by the host computer. Additionally or alternatively, in an optional second step 920, the UE provides user data. In an optional substep 921 of the second step 920, the UE provides the user data by executing a client application. In a further optional substep 911 of the first step 910, the UE executes a client application which provides the user data in reaction to the received input data provided by the host computer. In providing the user data, the executed client application may further consider user input received from the user. Regardless of the specific manner in which the user data was provided, the UE initiates, in an optional third substep 930, transmission of the user data to the host computer. In a fourth step 940 of the method, the host computer receives the user data transmitted from the UE, in accordance with the teachings of the embodiments described throughout this disclosure.

FIG. 10 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 10 will be included in this section. In an optional first step 1010 of the method, in accordance with the teachings of the embodiments described throughout this disclosure, the base station receives user data from the UE. In an optional second step 1020, the base station initiates transmission of the received user data to the host computer. In a third step 1030, the host computer receives the user data carried in the transmission initiated by the base station.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a receiver for frequency offset estimation, comprising:
   for each of two or more pairs of symbols in a set of symbols from a transmitter:
      calculating a phase difference between a first symbol and a second symbol in the pair; and
      removing from the calculated phase difference a phase difference component due to a difference between information carried in the first symbol and information carried in the second symbol, to obtain a residual phase difference component; and
   estimating a frequency offset between the receiver and the transmitter as a function of the respective residual phase difference components obtained for the two or more pairs.

2. The method of claim 1, wherein for each of the two or more pairs of symbols, the phase difference between the first symbol and the second symbol is calculated based on a plurality of samples in the first symbol and a plurality of samples in the second symbol.

3. The method of claim 2, wherein the plurality of samples in the first symbol are obtained by removing from the first symbol a first number of samples at a beginning of the first symbol and/or a second number of samples at an end of the first symbol, and the plurality of samples in the second symbol are obtained by removing from the second symbol the first number of samples at a beginning of the second symbol and/or the second number of samples at an end of the second symbol.

4. The method of claim 2, wherein each of the two or more pairs of symbols has a same interval between the first symbol and the second symbol in the pair.

5. The method of claim 1, wherein for each of the two or more pairs of symbols, said removing from the calculated phase difference the phase difference component due to the difference between the information carried in the first symbol and the information carried in the second symbol comprises:
   determining a plurality of possible phase differences due to the difference between the information carried in the first symbol and the information carried in the second symbol, based on a modulation scheme used for the pair of symbols;
   determining one of the plurality of possible phase differences as the phase difference component; and
   compensating for the phase difference component in the calculated phase difference.

6. The method of claim 1, wherein said estimating comprises: estimating the frequency offset based on an average of the respective residual phase difference components obtained for the two or more pairs.

7. The method of claim 1, wherein the set of symbols is received in one single carrier or subcarrier.

8. The method of claim 1, wherein the set of symbols is derived from a sequence of symbols received in a Narrow Band-Internet of Things, NB-IOT, uplink transmission.

9. The method of claim 8, wherein, when the sequence of symbols is transmitted in a non-Direct Current, DC, subcarrier, the set of symbols is derived by preprocessing the sequence of symbols to compensate for a frequency offset between the non-DC subcarrier and a DC subcarrier.

10. The method of claim 1, the two or more pairs of symbols comprise DeModulation Reference Signal, DMRS, symbols and data symbols.

11. A receiver comprising a processor and a memory, the memory comprising instructions executable by the processor whereby the receiver is operative to perform operations comprising:
for each of two or more pairs of symbols in a set of symbols from a transmitter:
calculating a phase difference between a first symbol and a second symbol in the pair;
removing from the calculated phase difference a phase difference component due to a difference between information carried in the first symbol and information carried in the second symbol, to obtain a residual phase difference component; and
estimating a frequency offset between the receiver and the transmitter as a function of the respective residual phase difference components obtained for the two or more pairs.

12. A computer program product comprising a computer program, the computer program comprising code/computer readable instructions which when executed by a processor causes a receiver to perform operations comprising:
for each of two or more pairs of symbols in a set of symbols from a transmitter:
calculating a phase difference between a first symbol and a second symbol in the pair; and
removing from the calculated phase difference a phase difference component due to a difference between information carried in the first symbol and information carried in the second symbol, to obtain a residual phase difference component; and
estimating a frequency offset between the receiver and the transmitter as a function of the respective residual phase difference components obtained for the two or more pairs.

* * * * *